(12) United States Patent
Kang

(10) Patent No.: US 7,422,253 B2
(45) Date of Patent: Sep. 9, 2008

(54) GLASS HANDLING TOOL AND METHOD OF CARRYING GLASS

(75) Inventor: Jong Dae Kang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 113 days.

(21) Appl. No.: 11/166,160

(22) Filed: Jun. 27, 2005

(65) Prior Publication Data

US 2006/0044483 A1 Mar. 2, 2006

(30) Foreign Application Priority Data

Jun. 30, 2004 (KR) .................. 10-2004-0050594
Jun. 27, 2005 (KR) .................. 10-2005-0055669

(51) Int. Cl.
*B65G 7/12* (2006.01)
(52) U.S. Cl. ........................... 294/15; 294/169
(58) Field of Classification Search ............ 294/1.1, 294/15, 67.33, 119.1, 901, 169; 414/935, 414/941
See application file for complete search history.

(56) References Cited

U.S. PATENT DOCUMENTS

| 1,237,788 | A | * | 8/1917 | Keister | 294/15 |
| 1,983,067 | A | * | 12/1934 | Butner | 294/26 |
| 2,920,422 | A | * | 1/1960 | Freiberg | 269/46 |
| 3,007,710 | A | * | 11/1961 | Sykes | 280/42 |
| 3,138,265 | A | * | 6/1964 | Hansen | 414/428 |
| 3,909,056 | A | * | 9/1975 | Duwe | 294/67.22 |
| 3,913,965 | A | * | 10/1975 | Muller et al. | 294/67.22 |
| 3,937,485 | A | * | 2/1976 | Shourek et al. | 280/35 |
| 4,968,049 | A | * | 11/1990 | Johnson | 280/47.24 |
| 6,241,297 | B1 | * | 6/2001 | Miller et al. | 294/15 |
| 6,572,320 | B2 | * | 6/2003 | Davis | 414/217 |
| 6,857,836 | B2 | * | 2/2005 | Keller | 414/11 |
| 2002/0044853 | A1 | * | 4/2002 | Keller | 414/11 |
| 2003/0178866 | A1 | * | 9/2003 | Chae et al. | 294/119.1 |

* cited by examiner

*Primary Examiner*—Dean J Kramer
(74) *Attorney, Agent, or Firm*—Mckenna Long & Aldridge LLP

(57) ABSTRACT

A glass handling tool and a method of moving a glass substrate are provided. The glass handling tool includes support members, moving members, and a body. The support members support a glass substrate. The moving members fix the support members. The body is coupled with the moving members.

6 Claims, 8 Drawing Sheets

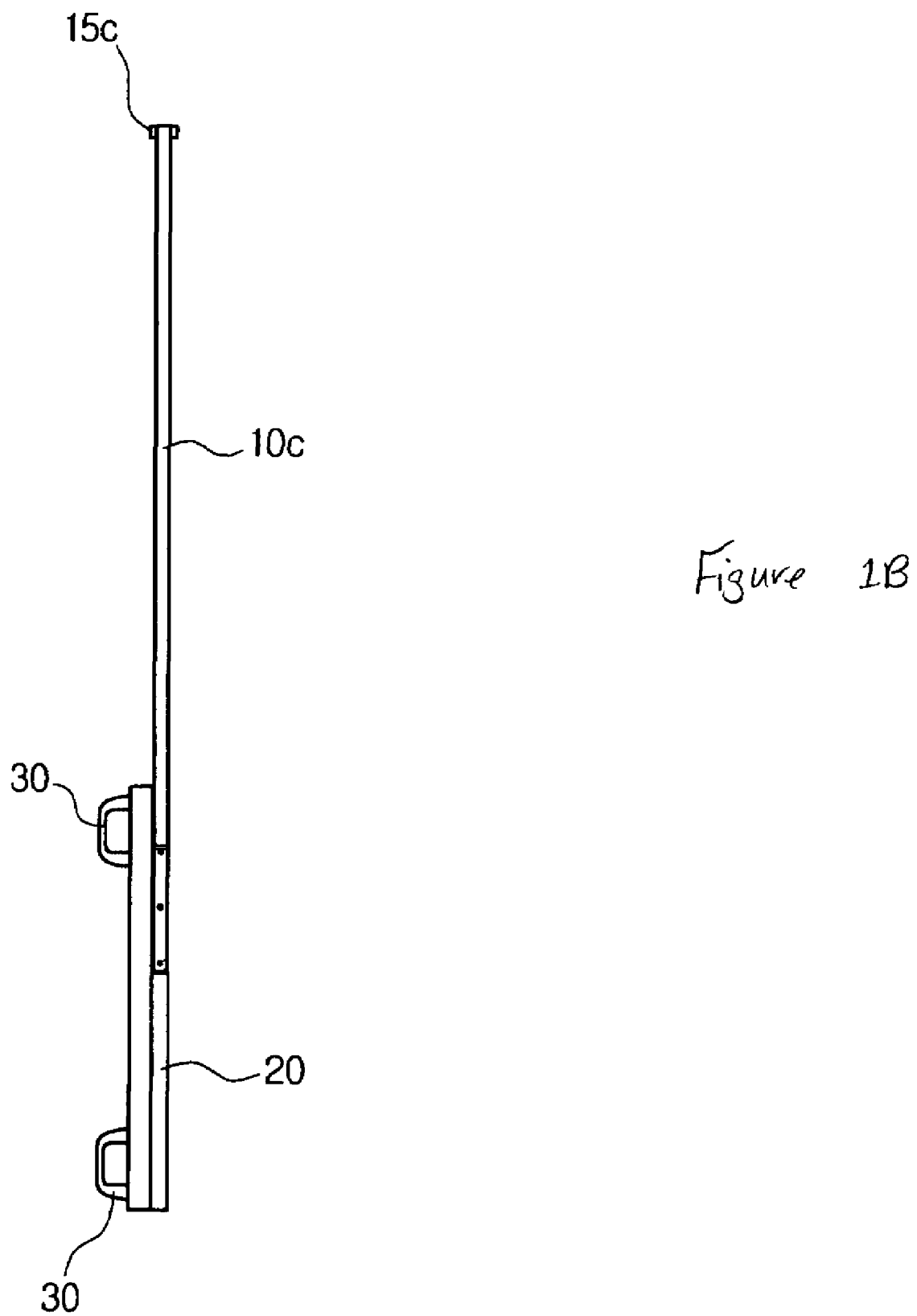

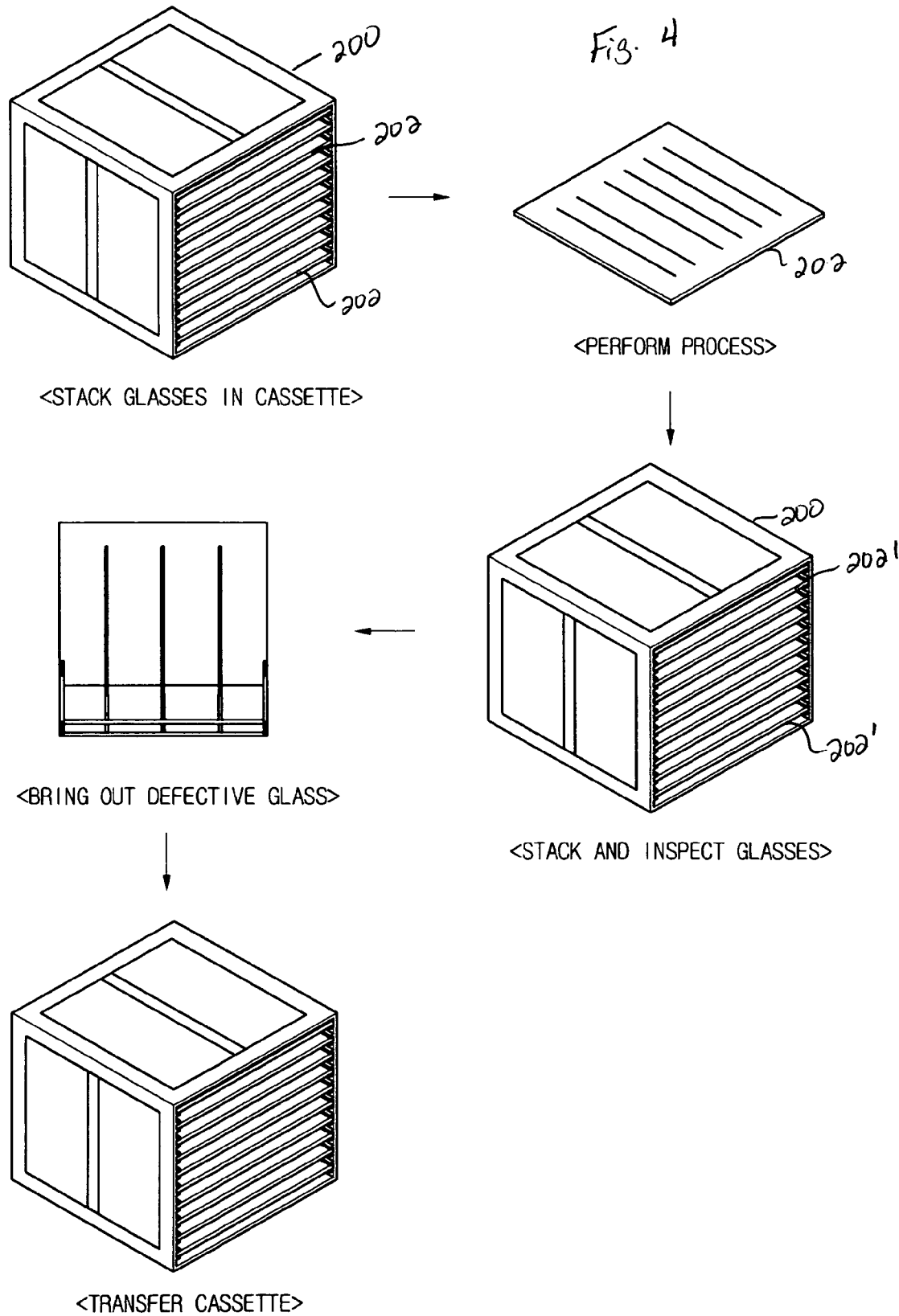

GLASS HANDLING TOOL AND METHOD OF CARRYING GLASS

This application claims the benefit of Korean Patent Application Nos. P2004-50594, filed on Jun. 30, 2004, and P2005-55669, filed on Jun. 27, 2005 which are hereby incorporated by references for all purposes as if fully set forth herein.

BACKGROUND OF THE INVENTION

1. Field of the Invention

The present invention relates to a glass substrate handling tool, and more particularly, to a glass substrate handling tool which transports glass substrates, a method of handling glass substrates, and a method of manufacturing a liquid crystal display (LCD).

2. Description of the Related Art

Rapid development of flat displays has led to LCDs which are relatively small and are light weight. Development has also led to LCDs having enhanced performance.

Though a CRT (cathode ray tube) used for an information display has advantages from a performance and price standpoint, the CRT has many disadvantages, such as size and lack of portability.

The advantages of LCDs, which include a relatively small size, light weight, and low power consumption, has made them an attractive alternative to CRTs. Accordingly, LCDs are increasingly being used with information processing devices that have a display.

During operation, an LCD applies a voltage to a predetermined molecular arrangement in a liquid crystal (LC) to covert the molecular arrangement into a second molecular arrangement. The change in molecular arrangement changes the optical properties of the liquid crystal, including birefringence, optical rotation, and dichroism, and optical scattering of an LC cell emitting light. The second molecular arrangement changes the optical properties thereby changing an image which is viewable on the LCD. Thus, the LCD functions by modulating light passing through liquid crystals.

In the LCD, a mask process is performed on a glass substrate to form a color filter substrate having a color filter layer thereon or an array substrate having a pixel electrode and TFT switching devices.

During manufacturing of a LCD, glass substrates are stacked on a cassette and moved to various process chambers.

When the stacked cassette is moved to a process chamber, the glass substrates are sequentially brought into and out of the cassette with a robot during processing in the chamber.

A related art LCD has been used for a cellular phone display window, a measurement instrument display window, and a small-sized notebook computer. In addition, LCDs have been used for displays having larger sizes, such as a TV monitor.

As a result, the sizes of glass substrates used during the manufacturing process of the LCD has increased from 1100 mm×1250 mm to 1500 mm×1800 mm and larger.

In the related art, as the size of the glass substrate was less than 1100 mm×1250 mm, an operator manually handled the glass substrate after the glass substrate was taken from the cassette. Moreover, an operator manually placed the glass substrate back into the cassette. However, when the size of the glass substrate exceeds 1500 mm×1800 mm, it is difficult for an operator to manually handle the glass substrate.

Since there is no separate tool for an operator to handle a relatively large glass substrate, the glass substrate may break when an operator manually handles it.

Therefore, a need exists for a tool which handles a large glass substrate during a manufacturing process.

SUMMARY OF THE INVENTION

Accordingly, the present invention is directed to a glass handling tool and a method of handling a glass substrate that substantially obviates one or more problems due to limitations and disadvantages of the related art.

An advantage of the present invention is to provide a glass handling tool and a method of handling a glass which allows an operator to safely handle a glass substrate used during manufacturing of a relatively large LCD.

An additional advantage of the present invention is to provide a method of manufacturing an LCD which allows safe handling of a glass substrate during the manufacturing process.

Additional advantages, and features of the invention will be set forth in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a glass handling tool including: support members configured to support a glass substrate; moving members configured to fix the support members; and a body coupled to the moving members.

In another aspect of the present invention, there is provided a method of carrying a glass substrate including: providing a glass handling tool having support members for supporting a glass substrate, moving members for fixing the support members, respectively, and a body coupled to the moving members and having a knob formed on an edge thereof; inserting the support members of the glass handling tool into a cassette to seat the glass substrate on the support members; and moving the glass substrate using the knob formed on the body.

In another embodiment of the present invention, a glass substrate handling tool is claimed. The glass substrate handling tool includes a body, a moving member coupled with the body, and a support member coupled with the moving member. The support member is configured to hold a glass substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this speciofication, illustrate embodiments of the invention and together with the description serve to explain the principle of the invention. In the drawings:

FIG. 1B is a side view of a glass handling tool according to the present invention;

FIG. 4 illustrates a process for manufacturing using a glass handling tool in accordance with the present invention.

DETAILED DESCRIPTION OF THE INVENTION

Reference will now be made in detail to embodiments of the present invention, examples of which are illustrated in the accompanying drawings.

Figure 1A:
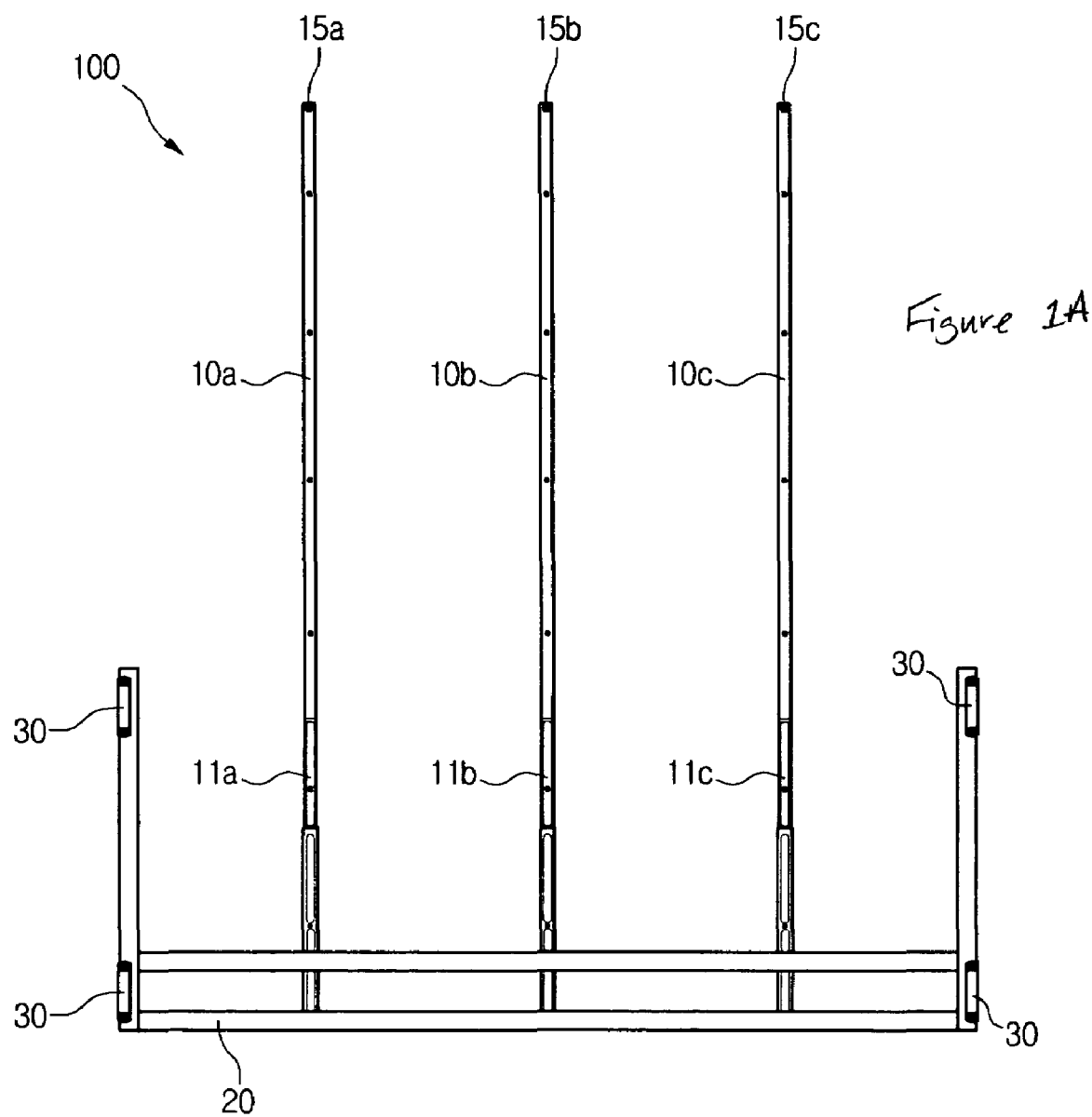
FIG. 1A is a plan view of a glass handling tool according to the present invention.

FIG. 1A is a plan view of a glass handling tool in accordance with the present invention. FIG. 1B is a side view of a glass handling tool.

Referring to FIGS. 1A and 1B, the glass handling tool 100 includes support members 10a, 10b, and 10c, moving members 11a, 11b, and 11c, and a body 20. The support members 10a, 10b, and 10c support a glass substrate when the glass substrate is removed from a cassette (not shown) which holds stacked glass substrates. The moving members 11a, 11b, and 11c couple with the support members 10a, 10b, and 10c to fix the same. The body 20 couples with the moving members 11a, 11b, and 11c.

The moving members 11a, 11b, and 11c may move at predetermined intervals along the body 20. Stopper pads 15a, 15b, 15c, which prevent slippage of a glass substrate, are disposed on each edge of the support members 10a, 10b, and 10c.

A knob 30, located on both sides of the body 20, allows an operator to grasp the body 20 with his or her hands when carrying a glass substrate.

In the glass handling tool 100, the support members 10a, 10b, and 10c are inserted into the cassette such that glass substrates stacked in the cassette may be seated on the support members 10a, 10b, and 10c.

The moving members 11a, 11b, and 11c coupled with the support members 10a, 10b, and 10c are positioned such that the weight of a glass substrate may be evenly distributed on the support members 10a, 10b, and 10c.

Thus, the support members 10a, 10b, and 10c may evenly support a glass substrate by moving the moving members 11a, 11b, and 11c along the body 20.

When a glass substrate is seated on the support members 10a, 10b, and 10c, an operator removes the glass substrate from the cassette using the knob 30 disposed on both sides of the body 20.

When the glass substrate is removed from the cassette, the glass substrate is vertically erect within the glass handling tool 100. The glass substrate remains upright because the body 20 and the support members 10a, 10b, and 10c of the glass handling tool 100 are spaced at a predetermined interval from each other such that the glass substrate does not fall in any direction.

More specifically, the glass substrate is inserted between the body 20 and the support members 10a, 10b, and 10c, such that the glass substrate does not shake or fall.

Therefore, an operator can safely handle the glass substrate using the glass handling tool 100.

Particularly, it is possible to safely remove a large glass substrate from a cassette and carry the large glass substrate.

Figure 2:
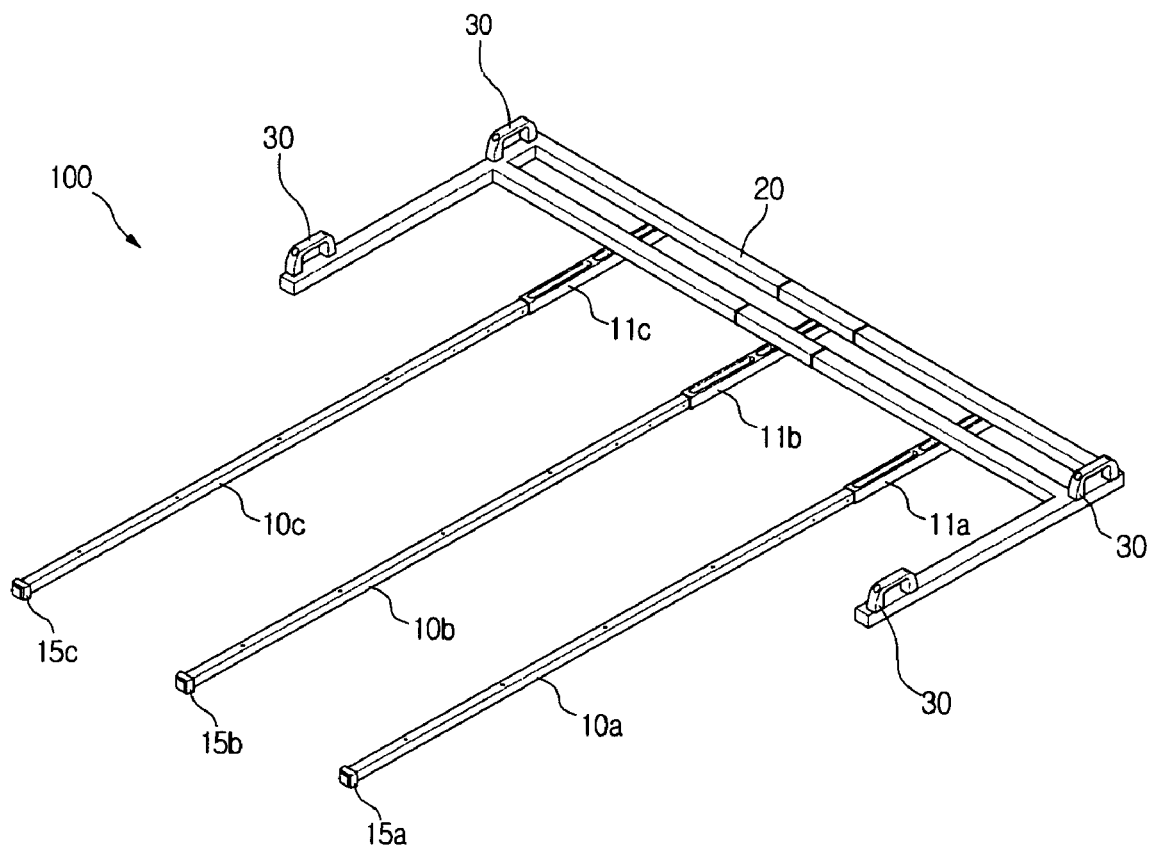
FIG. 2 is a perspective view of a glass handling tool according to the present invention.
Figure 3A:
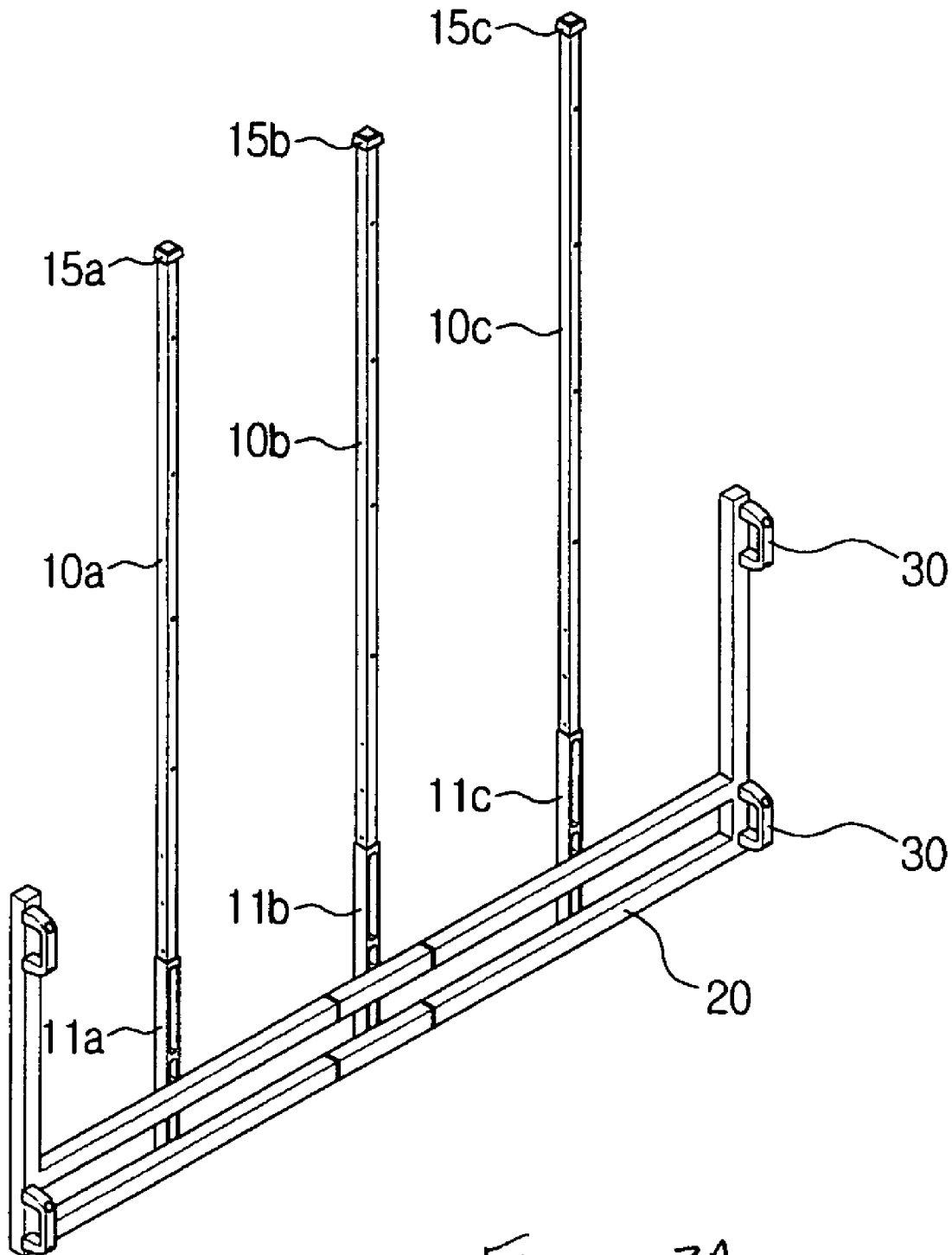
FIG. 3A is a view of a glass handling tool when the glass handling tool is unfolded according to the present invention.
Figure 3B:
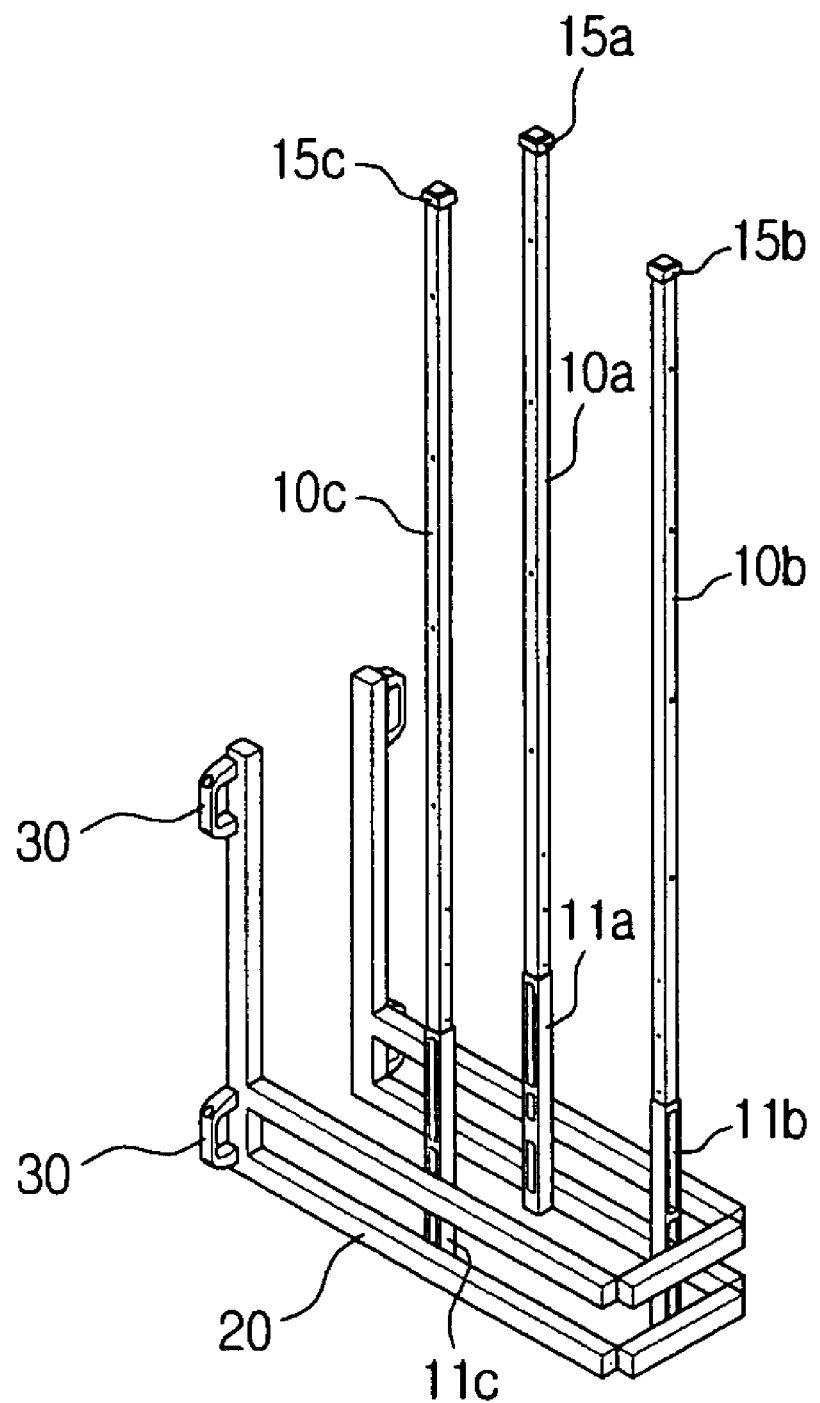
FIG. 3B is a view of a glass handling tool when the glass handling tool is folded according to the present invention.

FIG. 2 is a perspective view of a glass handling tool according to the present invention. FIG. 3A illustrates a glass handling tool when the glass handling tool is unfolded in accordance with the present invention. FIG. 3B is a view of a glass handling tool when the glass handling tool is folded according to the present invention.

Referring to FIG. 2, the support members 10a, 10b, and 10c of the glass handling tool 100 are formed of light metal or plastic and have a bar-shaped structure having a predetermined length.

Though the number of the support members 10a, 10b, and 10c is three in FIG. 2, more than three support members can be provided depending on the size of a glass substrate. It should be noted that at least two support members may also be used to depending on the size of the glass substrate.

Also, since the moving members 11a, 11b, and 11c connected with the support members 10a, 10b, and 10c are coupled with the body 20, an operator may easily handle the weight of a glass substrate applied to the support members 10a, 10b, and 10c with the body 20.

The stopper pads 15a, 15b, and 15c are attached on the edges of the support members 10a, 10b, and 10c, respectively. The stopper pads 15a, 15b, and 15c prevent slippage of a glass substrate when the glass substrate is moved to or removed from the cassette.

FIG. 3A illustrates a glass handling tool when the glass handling tool is unfolded in accordance with the present invention. Additionally, FIG. 3B shows the glass handling substrate when the glass handling substrate is folded, in accordance with the present invention.

Referring to FIGS. 3A and 3B, since the glass handling tool 100 can be folded in half around a central portion of the body 20, the body 20 may be unfolded as illustrated in FIG. 3A when the glass handling process is performed. Moreover, the body 20 is folded in half and stored as illustrated in FIG. 3B after the glass handling process is finished.

Particularly, since the glass handling tool 100 can be vertically folded in left and right directions around the central portion of the body 20, the glass handling tool 100 occupies a minimal amount of storage space.

Applications having larger LCD's typically use a glass substrate having dimensions of about 1500 mm×1800 mm and more.

The large glass substrates are stacked on a cassette and sequentially processed during the manufacturing of an LCD. The large glass substrates maintain their size until they are cut to a LC panel size after manufacturing a TFT substrate, which is a lower substrate of the LCD, manufacturing a color filter substrate, and attaching the TFT substrate and the color filter substrate.

The size of the glass substrate increases the possibility of damage while manufacturing both the TFT and the color filter substrate, during attachment of the substrates and during inspection. In addition, the size makes it difficult to handle the glass substrate during manufacturing.

FIG. 4 illustrates the use of a glass handling tool for manufacturing an LCD in accordance with an embodiment of the present invention.

The process shown in FIG. 4 is repeated for each glass substrate. More specifically, the processes of manufacturing the TFT substrate and manufacturing the color filter substrate are repeated for each glass substrate along with the attaching process and the inspection process.

Referring to FIG. 4, during a process of manufacturing a LCD, glass substrates 202 are stacked in a cassette 200 and moved to a process chamber where the next process is performed.

When the cassette 200 is moved, a robot (not shown) disposed in the chamber sequentially brings out each of the glass substrates 202 from the cassette 200 and moves each of the glass substrates 202 into the process chamber.

After processing, the robot sequentially stacks process-completed glass substrates 202' into the cassette 202 and moves the cassette 202 to a next process chamber.

At this point, when processing is complete and the glass substrates 200' are stacked in the cassette 200, an operator inspects for cracks or defects of the glass substrates 200'. When a glass substrate having a crack or a defect is found, the defective glass substrate is removed from the cassette 200 using the glass handling tool 100 illustrated in FIG. 1.

In the past, an operator had to remove the glass substrates with their hands. However, the defective glass substrate would frequently damage other, non-defective glass substrates stacked on the cassette.

However, when the defective glass substrate is removed using the glass handling tool 100, the defective glass substrate may be removed from the cassette without damaging other, non-defective glass substrates.

After the defective glass substrate is removed using the glass handling tool 100, the cassette is transferred to a next process chamber.

Since the above process repeatedly occurs during the process of manufacturing the LCD, the above method of removing defective glass substrates is applied in the same manner.

Figure 5:
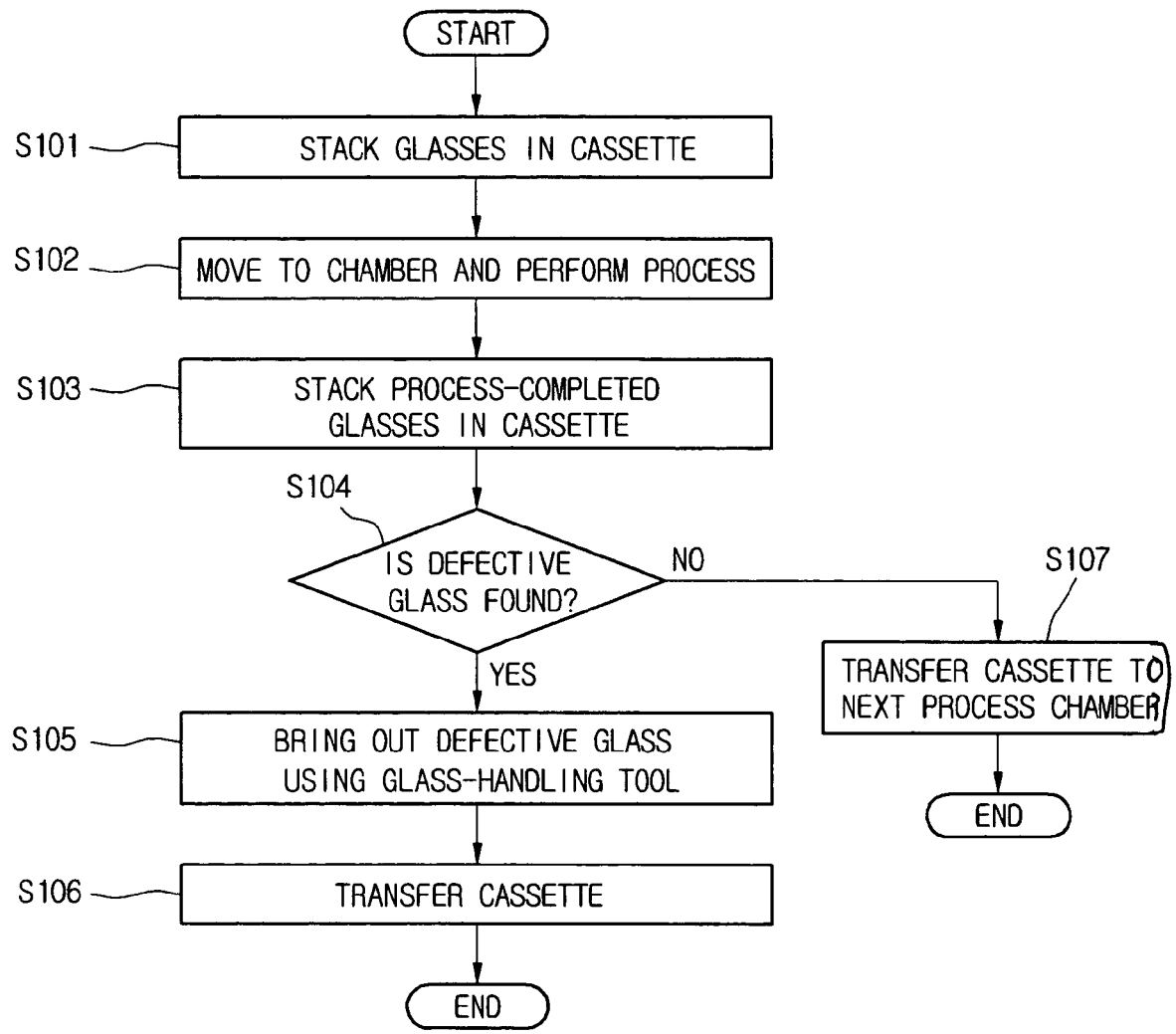
FIG. 5 is a flowchart illustrating a process of using a glass handling tool during the manufacturing of a LCD.

FIG. 5 is a flowchart of a process in which a glass handling tool is used in a process of manufacturing an LCD of the present invention.

Referring to FIG. 5, the glass substrates are stacked in a cassette and the cassette is moved to a process chamber (S101 and S102) where the glass substrates are processed.

When the cassette is moved to the process chamber, the glass substrates stacked in the cassette are sequentially brought into the process chamber to perform the process (S102).

After that, when the process is completed in the process chamber, the process-completed glass substrates are stacked in the cassette and then an operator inspects a glass having a crack or a defect (S103 and S104).

When a defective glass substrate is found during a glass inspection process, the defective glass substrate is removed from the cassette using the inventive the glass handling tool 100 (S104 and S105).

When the defective glass substrate are all brought out from the cassette, the cassette is moved for a next process (S106).

However, if none of the glass substrates in the cassette are defective, the cassette is moved to a next process chamber for subsequent processing of the glass substrates (S104 and S107).

Figure 6:
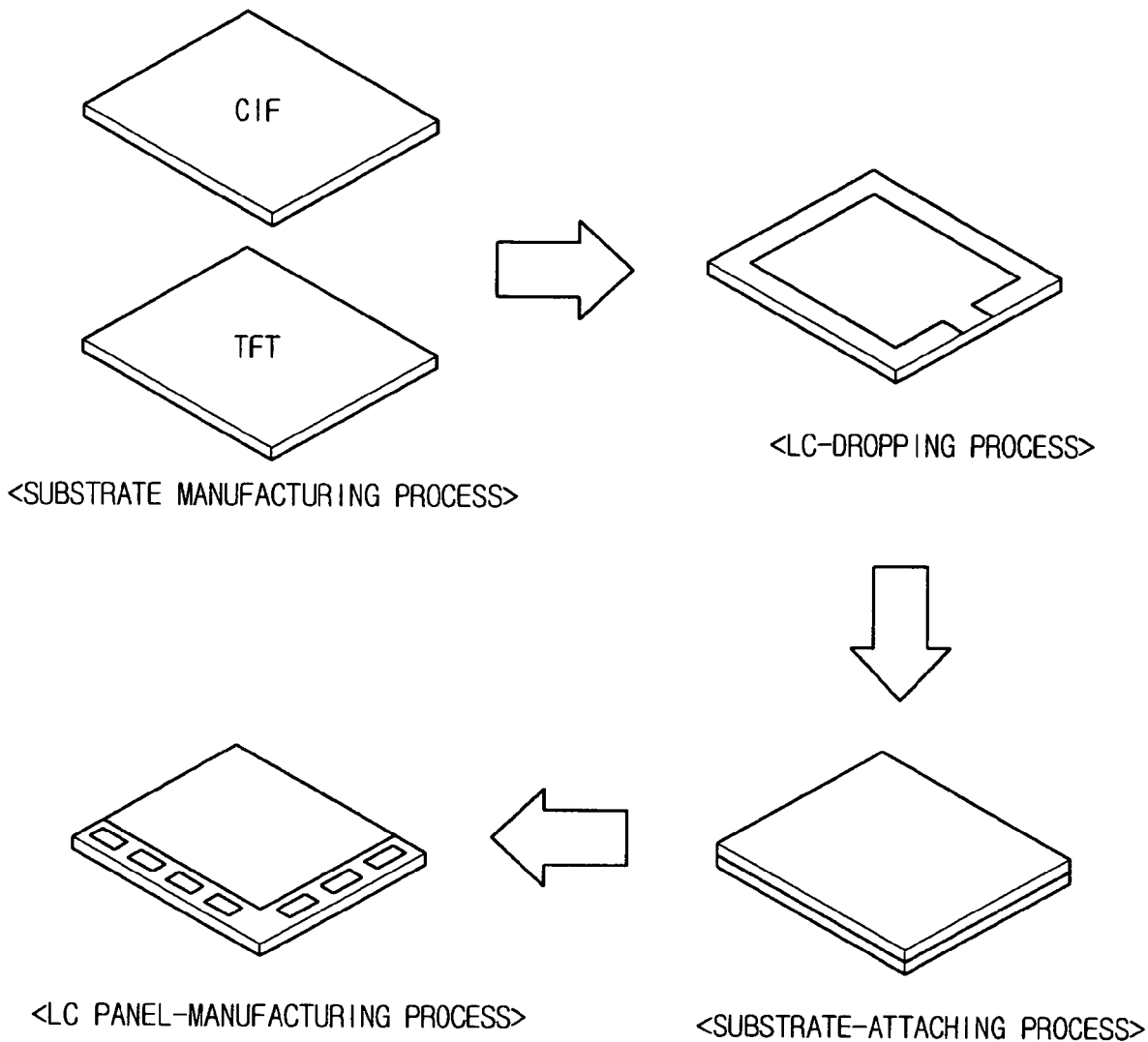
FIG. 6 shows a process of manufacturing a LCD in accordance with an embodiment of the present invention.

FIG. 6 is a view of a process of manufacturing an LCD according to the present invention.

Referring to FIG. 6, a first substrate of an LCD is manufactured by performing a number (e.g., 3-5) of mask processes and a second substrate is also manufactured by performing several mask processes.

Gate electrodes, an active layer, data lines, source/drain electrodes, a passivation film, and pixel electrodes, are formed while manufacturing the first or second substrate of the LCD during the manufacturing process. A black matrix, a color filter layer, and a common electrode, are also formed while manufacturing the first or second substrate, during the manufacturing process.

The TFT substrate or the color filter substrate may be formed on the first substrate. Similarly, the TFT substrate or the color filter substrate may be formed on the second substrate.

When the first substrate and the second substrate are completed, an LC-dropping process is performed. Since a process of distributing spacers on the substrate, an aligning process, and sealing process are performed during the LC-dropping process, a glass-handling process is required.

Also, since the aligning process, the attaching process, and the cutting process are performed when attaching the first substrate to the second substrate, an operator moves a glass substrate using the cassette and removes the glass substrate from the cassette to perform the attaching process. The operator then stacks the process-completed glass substrate in the cassette.

As illustrated in FIG. 4, the glass handling tool 100 is used to move a defective glass substrate and handle a glass substrate during stacking and moving the glass substrates using the cassette while manufacturing a LCD.

When a glass substrate is cut by an LC panel unit after the attaching process, the size of the LC panel is small and the glass handling tool may not be used. However, in the case of a large-sized LC panel, the glass substrate may be handled using the glass handling tool 100 as illustrated in FIG. 4.

Therefore, using the glass handling tool of the present application, a team, for example, of two operators, can remove and handle a glass substrate from the cassette.

Particularly, according to the present invention, distribution of the glass substrate weight and slippage of the glass substrate that might occur during the glass handling process have been mitigated such that the glass handling process can be safely performed.

As described above in detail, the present invention allows a user to safely handle a glass substrate used in the manufacturing process of a large-sized LCD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A glass handling tool, comprising:
   support members configured to support a glass substrate, wherein the support members are arranged at predetermined intervals in parallel;
   moving members connected to the support members;
   a body coupled with the moving members and configured to vertically fold around a central portion of the body; and
   a plurality of knobs connected to the body.

2. The glass handling tool according to claim 1, wherein the moving members-are located at predetermined intervals along the body.

3. The glass handling tool according to claim 1, wherein the support members include a stopper pad disposed on an edge to prevent slippage of the glass substrate.

4. The glass handling tool according to claim 1, wherein the knobs are configured to allow an operator to grasp the body when carrying the glass substrate.

5. The glass handling tool according to claim 1, wherein the glass handling tool includes at least two support members.

6. The glass handling tool according to claim 1, wherein the glass substrate is inserted and fixed between the support members and the body.

* * * * *